No. 785,998. PATENTED MAR. 28, 1905.
J. BEVINGTON.
WHEEL.
APPLICATION FILED JULY 19, 1904.
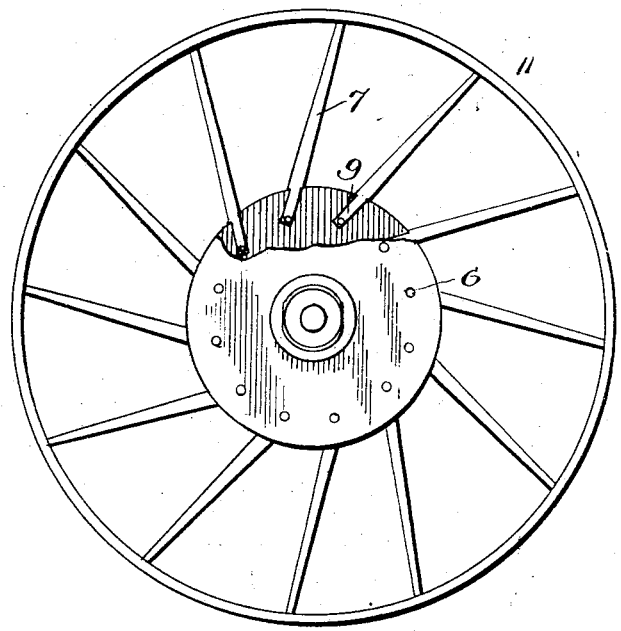
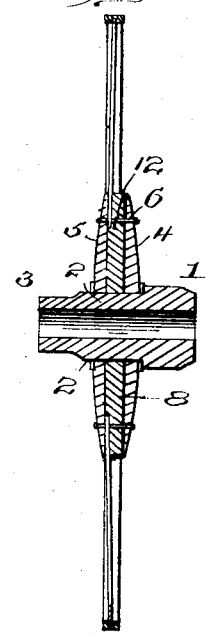
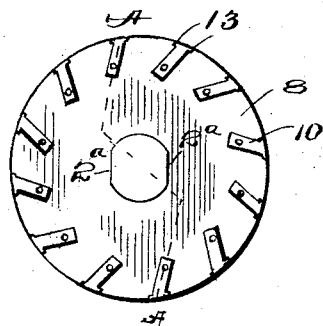
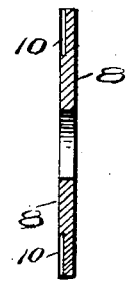
Witnesses
J. M. Fowler Jr.
Edwin E. Vrooman.
Inventor
John Bevington,
By Mason, Fenwick & Lawrence,
his Attorneys.

No. 785,998. Patented March 28, 1905.

UNITED STATES PATENT OFFICE.

JOHN BEVINGTON, OF CORDOVA, NEBRASKA.

WHEEL.

SPECIFICATION forming part of Letters Patent No. 785,998, dated March 28, 1905.

Application filed July 19, 1904. Serial No. 217,264.

*To all whom it may concern:*

Be it known that I, JOHN BEVINGTON, a citizen of the United States, residing at Cordova, in the county of Seward and State of Nebraska, have invented certain new and useful Improvements in Wheels; and I do hereby declare the following to be a full, clear, and exact description of the invention, such as will enable others skilled in the art to which it appertains to make and use the same.

This invention relates to improvements in wheels.

The object of the invention is to improve the construction, broadly, of a wheel which may be used for a vehicle of any description, pulleys or the like, or for analogous purpose in which a wheel may be employed.

Another object of the invention is to improve the construction of a wheel which is provided with spokes extending at a tangent to the hub portion of the wheel.

A still further object of the invention is to improve the construction of a wheel which is provided with a peculiarly-constructed hub portion and also tangentially-arranged spokes.

With these and other objects in view the invention consists in certain novel constructions, combinations, and arrangements of parts, as will be hereinafter fully described, illustrated in the accompanying drawings, and more particularly pointed out in the claims hereto appended.

In the drawings, Figure 1 is a view in side elevation of a wheel constructed in accordance with the present invention, shown partially in section. Fig. 2 is a vertical transverse sectional view of the wheel depicted in Fig. 1. Fig. 3 is a side view of an annulus which is employed in the construction of the wheel. Fig. 4 is a sectional view taken on line A A, Fig. 3.

Referring to the drawings by reference-numerals, 1 designates a removable hub member, which comprises in its construction a cylindrical body portion which is provided with squared shouldered portions 2 2 and with an annular extension 3, extending therefrom. Removably positioned upon the hub member 1, by any ordinary means, is a plurality of annular plates 4 and 5, which are tapered from their central portion toward the outer edge. Each of said plates 4 and 5 is provided with a plurality of apertures 6, formed in a circle therein. Said apertures 6 are provided for the purpose of retaining the spokes 7 in a proper assembled position when all of the parts of a wheel are assembled, as will be hereinafter specified.

Removably mounted upon the hub member 1 and interposed between the plates 4 and 5 is an annular member 8, within which are secured the inner ends 9 of the spokes 7. The end 9 of each of the spokes 7 is preferably reduced in width, so as to form a tenon, which is adapted to be positioned within a similarly-constructed tangentially-arranged recess 10 of a removable hub-plate 8. The opposite ends of the tapering spokes 7 are normally positioned within recesses formed in the tire 11.

It will be obvious that the number of spokes employed in the construction of the wheel is entirely optional with the constructor and that the dimensions of the different parts of the wheel is governed by the purposes to which the wheel is to be applied, as it will be obvious that if the wheel is constructed to be assembled with the running-gear of a vehicle necessary changes will have to be made over the construction of a wheel in accordance with the present invention, which is to be employed as a pulley or the like.

Referring to Fig. 3, it will be seen that the central aperture formed in annulus 8 is provided with squared surfaces $2^a$, which are adapted to be engaged by corresponding surfaces of the hub member 1. By means of this construction the hub member 1 is positively prevented from rotating when in its normal assembled position with the other elements employed in the construction of a completed device. This squared portion of member 1, in combination with the similarly-constructed apertured portion of plate 8, produces the same result as if member 8, plates 4 and 5, and hub member 1 were keyed together. When the spokes 7 are assembled, as shown in Fig. 1, with the other elements, rivets or bolts 12 are positioned within the apertures 6 of plates 4 and 5 and also within each of the apertures formed in plate or annular member 8 for the purpose of positively securing the spokes and the members employed in the hub construction in an assembled position.

If it is desired, the tire 11 may be removed and a felly substituted therefor.

The member 8, within which are positioned the tenons of the spokes 7, is preferably provided with a recess 13, which is of the same width as the widest portion of the tapering spokes 7. The recess portion 13 is adapted to receive the inner end of the widest portion of the spokes 7 when the spokes are assembled therewith, as is clearly depicted in the drawings.

While I have described in the foregoing description and illustrated in the accompanying drawings the preferred form of my invention, it will be obvious to one versed in the art to which this invention relates that certain alterations, modifications, and changes may be made in the construction of devices in accordance therewith, and I therefore reserve the right to make such alterations, modifications, and changes as shall fairly fall within the spirit and scope of the claims.

Having thus fully described my invention, what I claim as new, and desire to secure by Letters Patent, is—

1. In a device of the character described, the combination of a hub, comprising a body portion provided with two parallel sides, removable, comparatively narrow, disk-shaped plates having apertures positioned upon said hub, the apertured portion of the plates provided with parallel portions adapted to be positioned upon similar portions of the hub, a comparatively narrow annulus having a central aperture interposed between said plates and positioned upon the hub, the apertured portion of the annulus provided with parallel portions adapted to engage the similar portion of the hub, said annulus provided with approximately parallel, tangentially-arranged recesses upon one side, each of the recesses provided with an enlarged portion at its outer end, said annulus having an aperture formed in each of the recessed portions thereof, a tapering spoke provided with a reduced inner end positioned in each of the tangentially-positioned recesses of the annulus, said plates provided with apertures registering with the apertures of the annulus when the parts are in an assembled position, transverse connecting and securing means positioned within the apertured portion of said plates and annulus for retaining the same in a fixed position, and a tire secured upon the ends of said spokes.

2. In a device of the character described, the combination of a hub provided with parallel sides, parallel, movable plates provided with a squared, apertured portion positioned upon said hub, a removable, annulus interposed between said plates, said annulus having a squared, central, apertured portion and tangentially-positioned recesses formed upon one side thereof and near its edge, the recesses of the annulus provided with enlarged portions near one end, said annulus having an aperture formed in each of the recessed portions thereof, spokes positioned within the recesses of said annulus, a tire positioned upon said spokes, and transverse means positioned within the apertured portions of the recesses and connected to and retaining the plates and spokes in an assembled position with said annulus.

3. A metal wheel, comprising a hub structure, said hub structure comprising a hub member provided with parallel sides, an integral shoulder formed upon one end of said member, said hub member provided with a reduced end of less width than said shouldered portion, a pair of disk-shaped plates having central, squared, apertured portions positioned upon said hub member, a flat annulus having a squared, central, apertured portion interposed between said plates, said annulus provided with tangentially-arranged recessed portions formed upon one side thereof and near the outer edge, said recessed portions of the same depth throughout their entire length and width, each of the recessed portions provided with an aperture formed therein near the inner end thereof, each of said recessed portions provided with an outer, enlarged end, a flat, tapering spoke provided with a tenon of the same width and thickness throughout its entire length, positioned within each of said recessed portions and having a part of the main body portion of the spoke extending into the enlarged portion of the recess, each of the tenons of the spokes having an aperture formed therein, said aperture of each of the tenons registering with the aperture of the recess, when positioned within said recess, said plates provided with apertures registering with each of the apertures of the tenons of the spokes and annulus, transverse securing means positioned within the apertured portion of the plates, tenons, and annulus, and a tire secured to the outer end of the flat spokes.

In testimony whereof I hereunto affix my signature in presence of two witnesses.

JOHN BEVINGTON.

Witnesses:
C. JUNG,
C. B. BLACKWELL.